Sept. 6, 1949.　　　　G. A. PETROE　　　　2,481,478
CARBON DIOXIDE VAPORIZER
Filed Nov. 19, 1945

INVENTOR
Gregory A. Petroe
BY
Pennie, Davis, Marvin & Edmonds
ATTORNEYS

Patented Sept. 6, 1949

2,481,478

UNITED STATES PATENT OFFICE 2,481,478

CARBON DIOXIDE VAPORIZER

Gregory A. Petroe, Kenmore, N. Y., assignor to Mathieson Chemical Corporation, a corporation of Virginia Application November 19, 1945, Serial No. 629,634

5 Claims. (Cl. 62—91.5)

This invention relates to improvements in vaporizers for subliming or vaporizing carbon dioxide in solid form to carbon dioxide gas which is used for various purposes such as in soda fountains and similar installations.

As far as known, the present types of vaporizers for solid carbon dioxide are of relatively small capacity so that it is necessary to break up the standard cube of solid $CO_2$ which has an external dimension of about ten and one-half inches. Furthermore, present vaporizers are of a capacity such that they require frequent charging.

I have discovered that a carbon dioxide vaporizer, which will accommodate one thousand pounds or more of solid carbon dioxide cubes, can be partitioned and arranged in such a way as to provide for an economical and regular stacking of the cubes to avoid waste space normally present when cubes are broken up. According to my invention, the improved vaporizer is constructed with the partitions specially arranged with respect to an opening and a closure of sufficient size to accommodate the standard ten-and-one-half inch cube of carbon dioxide.

I am aware of the fact that various types of containers provided with partitions have been proposed for different purposes. In some of these cases, the partitions are used for the purpose of transferring heat from the outside to the inside of the container, and such partitions serve no useful purpose for arranging the contents of the container. Where partitions have been provided which serve for some arrangement they are not used for the purpose of the present invention, but as in one case, for providing an even distribution of solids under jolting conditions. As far as known, none of the prior proposals contained in any patents or publications suggests the use of partitions in a carbon dioxide vaporizer for the purpose of arranging commercial standard blocks of carbon dioxide in the container.

The primary object, therefore, of the present invention is to provide an improved $CO_2$ vaporizer including partitions arranged in a particular manner to effect the economical and regular stacking of standard blocks of carbon dioxide.

According to a preferred form of my invention, the improved vaporizer comprises an upright pressure cylinder adapted to accommodate a considerable charge of solid carbon dioxide, as for example, one thousand pounds or 20 cubes, said cylinder having a top opening for charging it with cubes of carbon dioxide of standard commercial size, a baffle in the cylinder positioned substantially below the opening and dividing the cylinder into a series of vertical compartments for the stacking of the standard carbon dioxide cubes, a closure for the opening, and means for distributing a heating medium, such as hot water, onto the external surface of the cylinder.

According to a preferred construction, the improved closure assembly comprises a pressure plate substantially fitting the small diameter portion of the opening and having a rim for preventing its entrance into the cylinder, a gasket above the rim of the pressure plate, and a threaded bushing adapted to be threaded into the upper part of the opening to bear against the gasket.

A preferred form of baffle for the vaporizer comprises plates or sheets forming a vertical cross supported within the cylinder and having a center plate attached to its lower end for supporting and shifting the cubes of solid carbon dioxide toward the inside wall of the cylinder.

The improved apparatus of the present invention includes other features and advantages which will be apparent to those skilled in the art from the following more detailed description of the vaporizer taken in connection with the accompanying drawings in which.

Figure 1:
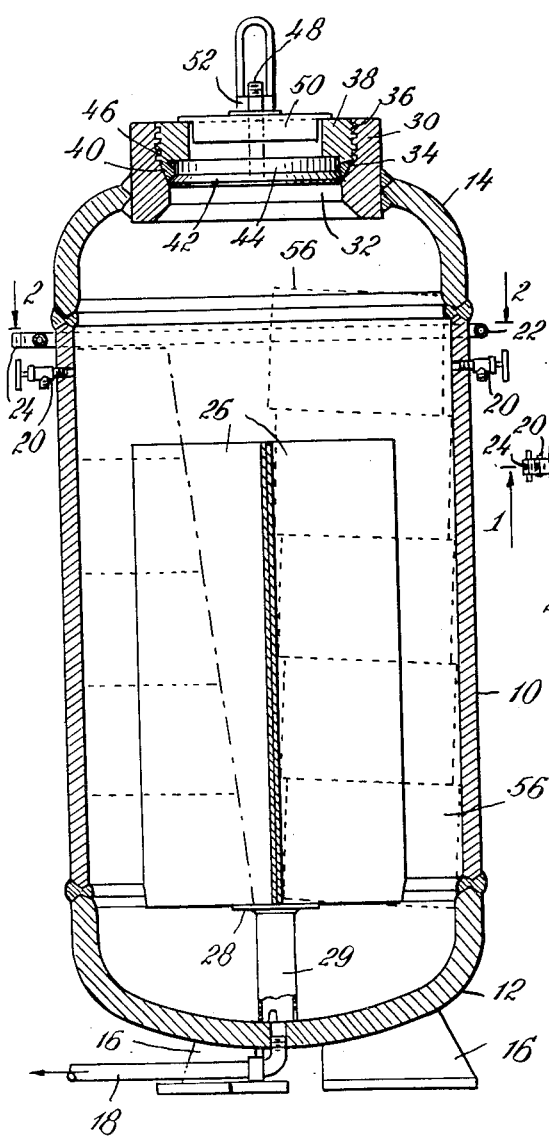
Fig. 1 is a vertical sectional view taken approximately on the line 1—1 of Fig. 2, showing the structure of the baffle arrangement and the manner in which it facilitates the stacking of the cubes of solid carbon dioxide.

Referring to the drawings, the improved apparatus comprises a heavy steel walled cylinder 10 having heavy heads 12 and 14 welded thereto, the cylinder being adapted to operate at a pressure of 1200 lbs. per square inch. The cylinder 10 is supported in an upright position on three steel structural tee supports 16 which may be bolted to a suitable foundation or floor. The cylinder is provided with a drainage pipe 18 having a valve, not shown, and which is used for draining out any water deposited or used for washing out the cylinder. At the upper portion of the cylinder, valved outlet connections 20 are provided for delivering carbon dioxide gas through suitable tubing, not shown, to the points of use. Immediately above the valved outlets 20 is provided a spray ring 22 for hot water delivered through a line 24. The spray ring 22 extends entirely around the cylinder 10 and is provided with holes drilled at an angle so as to direct the spray onto the outside wall of the cylinder.

Figure 2:
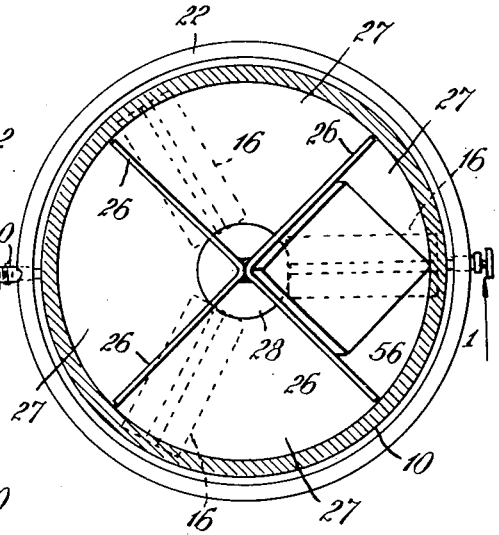
Fig. 2 is a horizontal cross-sectional view taken on the line 2—2 of Fig. 1.

An important feature of the present invention comprises a special baffle unit mounted in the cylinder and comprising four radial walls 26 attached to each other at approximately the vertical axis of the cylinder and extending substantially to the side wall of the cylinder, preferably without being attached thereto. The baffle is conveniently made by providing a pair of bent metal plates and welding them together at the bends in the manner indicated in Fig. 2, so that the joint occurs at about the axis of the cylinder. As shown in Fig. 1, the baffle walls 26 extend approximately from the top of the head 12 to a point a substantial distance below the head 14. More particularly, the top of the baffle is sufficiently below the opening in the top of the cylinder, so that a cube of solid carbon dioxide of standard dimensions may be inserted and rested upon the cross-shaped baffle formed by the plates 26 and then shifted into the desired compartment. In Fig. 2 it will be noted that the plates 26 divide the cylinder horizontally into a series of four equal compartments 27 into which the cubes are to be directed. The baffle comprising the plates 26 includes a cube supporting plate 28 in the form of a disc welded to the bottom of the plates 26 and to the top of a tubular baffle support 29 which rests upon the inside wall of the head 12 around the drainage outlet, the lower end of the support 29 being provided with notches or openings as shown to permit water to flow to the outlet 18. The plate 28 projects uniformly at the lower end of each compartment 27 and serves to catch and support the inner corner of a cube of $CO_2$, while the member 29 supports the plates 26 and 28 and the entire original charge of $CO_2$.

Figure 3:
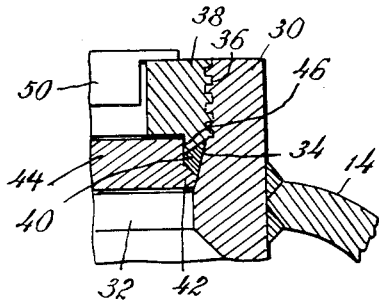
Fig. 3 is an enlarged broken sectional view showing the details of construction and arrangement of the improved closure assembly of the vaporizer.

The charging opening and closure assembly therefor, is mounted in the head 14 and comprises a heavy metal cylindrical member 30 welded in the head 14, as shown, and having the cross-sectional shape indicated in Figs. 1 and 3 of the drawings. The narrowest section of the opening comprises a neck 32 above which is provided an outwardly and upwardly flaring conical surface 34. The upper portion of the cylinder 30 is threaded at 36 to receive a threaded ring-like bushing 38. The closure assembly includes the bushing 38, a gasket 40 of rubber or similar pliable impervious gasket material, and a pressure plate 42. The pressure plate 42 extends approximately to the neck 32 and has a lower conical surface which is adapted to rest upon the lower portion of the conical surface 34 but which is too large to pass through the neck 32. The pressure plate includes an upper cylindrical section 44 which fits rather snugly inside a downwardly-projecting flange 46 on the outer portion of the bushing 38, this flange having a conical shaped surface extending downwardly and inwardly from the margin of the bushing.

From the showing in Figs. 1 and 3 of the drawings, it will be apparent that the gasket 40 has a four-sided shape in cross-section in which the sides are of unequal length, two of which are adapted to fit the conical surface 34 of the conical surface of the plate 42 and of the flange 46, respectively. The remaining surfaces of the gasket bear against the cylindrical section 44 and the adjacent conical surface of the plate 42. The closure assembly includes a tightening bolt 48 threaded centrally in the plate 42 and which extends through a flanged block 50 resting on the bushing 38. A combination lifting ring and tightening nut 52 is threaded onto the top of the bolt 48 for drawing the plate 42 into engagement with the gasket 40. When the vaporizer is charged and the closure assembly is in place, the gas pressure operates against the pressure plate 42 to compress the gasket into the space between the bushing 38, the plate 42, and the surface 34. In order to prevent undue pressure on the gasket the plate 42 is preferably machined to specified limiting dimensions so that it is forced against the bushing ring 38 when the gasket is properly compressed.

A closure assembly having a gasket of the type shown and described, particularly with its tapered conical surfaces, permits adequate tightness to be obtained upon the gasket when the assembly is screwed into the opening of the vaporizer. The particular gasket shown also facilitates the removal of the closure assembly because as soon as the bushing 38 is unscrewed the gasket is removed rapidly out of contact with the conical surface 34, thus leaving the assembly relatively free for its removal from the vaporizer opening without the use of wrenches. It is to be understood of course that as an initial step in removing the closure assembly, the bushing 38 may have to be turned with a wrench for about a quarter turn, after which the bushing may be operated by hand.

The particular shape of the gasket 40 and its proportioning is such that when pressure is applied to the plate 42, the gasket is stretched to position so that the amount of flow which takes place in the gasket material is relatively low compared to that in gaskets of known construction which are supported on three sides with closure members presenting surfaces which are 90° with respect to each other. While the amount of compression to which the gasket of the present invention subjected is preferably controlled in order to secure the necessary gasket tightness by machining the closure parts, particularly the plate 42 and the bushing 38, to specified limiting dimensions, the control may be effected by including a shim between the bushing 38 and the plate 42, in order to prevent undue compression of the gasket material by the gas pressure, which might shorten the life of the gasket.

In the operation of the apparatus, the vaporizer is charged with cubes of solid carbon dioxide with the closure assembly removed from the opening, each cube being let down through the opening of the vaporizer onto the top of the partition walls 26 at their intersection, and shifted into one of the compartments 27 with one of the diagonals of the upper surface of the cube coinciding with a radius of the cylinder and with a line dividing one of the compartments 27. Then the cube is removed into the compartment so that its inner corner rests upon the plate 28 and it occupies the position of the cube 56 shown in Fig. 2 of the drawings. Three cubes are placed in each of the compartments 27 in this manner, after which a fourth cube is placed in each compartment until all of the compartments contain four cubes of solid carbon dioxide uniformly stacked. These cubes will extend above the plates 26 and be tilted slightly as is apparent from the showing in Fig. 1 of the drawings, in which a stack of the full sized cubes are shown by dash-and-dot lines in one of the compartments to the right. Finally, a fifth cube is placed upon each of the stacks of four, so that the cylinder contains 20 cubes of solid carbon dioxide, after which the closure assembly is installed in the manner described above. The apparatus is now ready for use and hot water of a temperature of about 200° F. or higher may be sprayed onto the outside wall of the cylinder from the spray ring 22, while carbon dioxide gas is withdrawn through the valved connections 20.

After the cubes have been vaporized or sublimed to a substantial extent, they will assume approximately the dash-and-dot line positions shown at the left in Fig. 1, which shows that as they vaporize away they move outwardly in close contact with the heated wall of the vaporizer. The plate 23 below the baffle walls 26 supports the cubes in a tilted position which causes them to shift toward the wall of the vaporizer where they absorb heat derived from the hot water sprayed from the ring 22.

From the foregoing description of the improved vaporizer of the present invention, it will be apparent that certain modifications may be made in the structure of the vaporizer and that the number of compartments may be varied in accordance with the diameter of the vaporizer and the particular shape of the blocks of carbon dioxide used for filling the vaporizer. The walls 26 may be solid or perforated, and may be supported by being spot welded to the cylinder wall although they are preferably supported free of the walls by the member 29. Such changes are contemplated as coming within the scope of the appended claims.

What I claim is:

1. A vaporizer for solid carbon dioxide comprising an upright pressure cylinder adapted to accommodate a considerable charge of solid carbon dioxide cubes, said cylinder having a top opening for charging the cylinder with cubes, a baffle in the cylinder positioned substantially below the opening and having vertical walls dividing the cylinder into a series of vertical compartments in which cubes may be stacked, the series of compartments being open-topped and each including a portion of the side wall of the pressure cylinder as one of its walls, whereby heat may be conducted from the outside of the cylinder to each compartment, a closure for said opening, and means for distributing a heating medium onto the external surface of the cylinder.

2. A vaporizer for solid carbon dioxide comprising an upright pressure cylinder adapted to accommodate a considerable charge of solid carbon dioxide cubes, said cylinder having a top opening for charging the cylinder with cubes, a baffle in the cylinder comprising vertical walls defining a vertical cross mounted substantially below and directly beneath the opening and dividing the cylinder into a series of vertical compartments each of which is adapted to receive a plurality of carbon dioxide cubes, said baffle having a top portion adapted to support a cube of carbon dioxide prior to being shifted into one of the compartments formed by the baffle, a closure for said opening, and means for distributing a heating medium onto the external surface of the cylinder.

3. A vaporizer for solid carbon dioxide comprising an upright pressure cylinder adapted to accommodate a considerable charge of solid carbon dioxide cubes, said cylinder having a top opening for charging the cylinder with cubes, a baffle in the cylinder substantially below the opening having a plurality of dividing walls arranged to divide the cylinder into vertical compartments extending from the cylinder axis, a plate at the bottom of the baffle and attached to said walls for engaging the inner corner of the lowermost cube of carbon dioxide in each compartment, a closure for said opening, and means for distributing a heating medium onto the external surface of the cylinder.

4. In a vaporizer for the vaporization of solid carbon dioxide including an upright pressure cylinder adapted to accommodate a considerable charge of solid carbon dioxide cubes, a top opening for the cylinder of a size to admit such cubes, and a closure for said opening, the improvement which comprises a baffle in the upright pressure cylinder positioned substantially below the opening and having vertical walls dividing the cylinder into a plurality of open-topped vertical compartments in which cubes of carbon dioxide may be stacked, each of said compartments being formed in part by a portion of the side wall of the pressure cylinder, whereby heat may be conducted from outside the pressure cylinder to each compartment, the closure for the opening in the cylinder comprising an assembly including a pressure plate seated on the wall of the opening on an annular seat thereof comprising an upwardly and outwardly flaring conical surface, an annular gasket engaging said plate and said surface, a threaded bushing threaded into the upper portion of the wall of said opening and having an inwardly tapering conical surface engaging said gasket, and means for distributing a heating medium onto the external side-wall surface of the cylinder.

5. In a vaporizer for the vaporization of solid carbon dioxide including an upright pressure cylinder adapted to accommodate a considerable charge of solid carbon dioxide cubes, a top opening for the cylinder of a size to admit such cubes, and a closure for said opening, the improvement which comprises a baffle in the upright pressure cylinder positioned below the opening and having vertical walls dividing the cylinder into a plurality of open-topped vertical compartments in which cubes of carbon dioxide may be stacked, a wall of each of said compartments comprising a portion of the side wall of the pressure cylinder whereby heat may be conducted from outside the pressure cylinder directly through the cylinder wall to each compartment therein, the top of said baffle being sufficiently below said opening to permit the shifting of cubes into all compartments, the opening in the cylinder having an annular wall comprising a lower surface portion flaring upwardly and outwardly, the closure for the opening in the cylinder comprising an assembly including a pressure plate seated in the opening on said upwardly and outwardly flaring surface, a gasket engaging said plate and resting on said surface, and a locking member engaging the upper portion of said opening with a locking connection and having an inwardly tapering and downwardly inclined conical surface engaging said gasket.

GREGORY A. PETROE.

REFERENCES CITED

The following references are of record in the file of this patent:

UNITED STATES PATENTS

| Number | Name | Date |
| --- | --- | --- |
| 2,120,057 | Merrill | June 7, 1938 |